United States Patent
Powell et al.

[11] Patent Number: 6,032,691
[45] Date of Patent: Mar. 7, 2000

[54] VALVE ASSEMBLY

[75] Inventors: Jonathan S. Powell; Dean Modesett, both of Mariposa, Calif.

[73] Assignee: Kaylynn, Inc., Baton Rouge, La.

[21] Appl. No.: 09/280,095

[22] Filed: Mar. 29, 1999

[51] Int. Cl.[7] .................................................... F16L 37/28
[52] U.S. Cl. ................... 137/614.04; 137/614.03
[58] Field of Search ..................... 137/614.02, 614.03, 137/614.04, 614.05

[56] References Cited

U.S. PATENT DOCUMENTS

| | | | |
|---|---|---|---|
| 2,864,628 | 12/1958 | Edleson | 137/614.04 |
| 3,409,045 | 11/1968 | Mackey et al. | 137/614.04 |
| 4,082,112 | 4/1978 | Schmidt | 137/614.04 X |
| 4,084,614 | 4/1978 | Ekman | 137/614.04 X |
| 4,769,137 | 9/1988 | Powell, Jr. . | |
| 4,770,207 | 9/1988 | Hofmann | 137/614.05 X |
| 5,042,840 | 8/1991 | Rieple et al. . | |
| 5,379,793 | 1/1995 | Powell . | |

OTHER PUBLICATIONS

Nov. 5, 1996, Disclosure Document No. 408429.

*Primary Examiner*—Kevin Lee
*Attorney, Agent, or Firm*—Roy, Kiesel & Tucker

[57] ABSTRACT

A valve assembly used to minimize chemical loss during the transfer of chemicals from one container to another is disclosed herein. The valve assembly minimizes chlorine or other process material loss to the environment by sealing the manifold and the cylinder to be filled from the environment while the valve assembly is connected or disconnected. The valve assembly includes an inlet valve connectable to an outlet valve, the inlet valve comprising a first plug positioned in a bore extending between an inlet and outlet port and a transfer tube engaging a bore of a first insert positionable within the bore of the inlet valve. The outlet valve comprises a second plug positioned in a bore extending between an inlet and outlet port and a second insert positionable within the bore of the outlet valve. The transfer tube has a first and second end configured to be insertable at least partially within respective bores of the first and second inserts, the first and second ends each having at least one port. A bore extends through the transfer tube to allow fluid communication between the first and second ends.

3 Claims, 2 Drawing Sheets

VALVE ASSEMBLY

BACKGROUND OF THE INVENTION

1. Field of the Invention.

This invention relates to a valve assembly for filling gas cylinders, more particularly a valve assembly that reduces the amount of gas wasted during the filling process.

2. Prior Art.

During tank filling processes when toxic or hazardous chemicals are being transferred into smaller cylinders, chemical loss occurs when the cylinders are connected to and disconnected from the manifold because the chemical sometimes remains in the lines that connect the manifold and the cylinders and leaks to the environment. This chemical loss is a health risk to both the operator and to the surrounding areas. Thus, a need exists for a valve connection that can minimize this chemical loss.

Several devices have been developed in the past, but none of these devices efficiently meets these concerns. An example of a prior art device is shown in U.S. Pat. No. 5,379,793. A need exists for an improved valve assembly that can decrease chemical loss every time a tank is filled while at the same time increasing the safety of the operators.

OBJECTS AND ADVANTAGES OF THE INVENTION

The design of the present valve assembly of this invention reduces chemical loss at the cylinder connections by sealing both the cylinder and the manifold from the environment when the cylinders are connected to and disconnected from the manifold. Thus, the chemical loss is decreased and safety of the operators in increased.

With the aforementioned considerations in mind, it is therefore an object of this invention to provide a safe and efficient apparatus and method for filling tanks and cylinders.

It is a further object of this invention to provide a tank filling apparatus that includes a valve assembly connected between the manifold and the cylinders that substantially minimizes process, material loss to the environment.

It is a further object of this invention to provide a valve assembly connected between the manifold and the cylinders that can reduces the health risks associated with operating a tank filling system where toxic or hazardous materials are being transferred through the apparatus.

These and other advantages and objects of this invention shall become apparent from the ensuing description of the invention.

SUMMARY OF THE INVENTION

A valve assembly may be used in connection with a tank filling apparatus, or in connection with other apparatus or methods. The valve assembly comprises an inlet valve connectable to an outlet valve having a first end adapted to engage a receptacle for holding process material and configured to have an inlet port; a second end adapted to engage said second end of an outlet valve and configured to have an outlet port; a bore extending between the inlet and outlet ports; and, a first plug movably positioned in the bore, having an open and a closed position, and sealing the inlet port from the outlet port when in the closed position. The valve assembly further comprises an outlet valve having a first end adapted to engage a source of process material and configured to have an inlet port; a second end adapted to engage the inlet valve and configured to have an outlet port; a bore extending between the inlet and outlet ports; and, a second plug movably positioned in the bore, having an open and a closed position, and sealing the inlet port from the outlet port when in the closed position. The valve assembly also comprises a transfer tube having a first end configured to be insertable into the inlet valve bore and configured to have at least one port; a second end configured to be insertable into the outlet valve bore and configured to have at least one port; and, a bore extending through the transfer tube, allowing fluid communication between the ports.

The valve assembly may further comprise inserts positionable within the bores of the inlet or outlet valves. The inserts have bores extending therethrough to allow fluid communication between the ends thereof which are configured with one or more ports. In such embodiments, the ends of the transfer tube are configured to be insertable into the bores of the inserts.

DETAILED DESCRIPTION OF PREFERRED EMBODIMENTS OF THE INVENTION

Illustrations of preferred construction, design, and methods of operation of the invention are set forth below with specific references to the Figure. However, it is not the intention of the inventor that the scope of his invention be limited to these preferred embodiments.

Figure 1A:
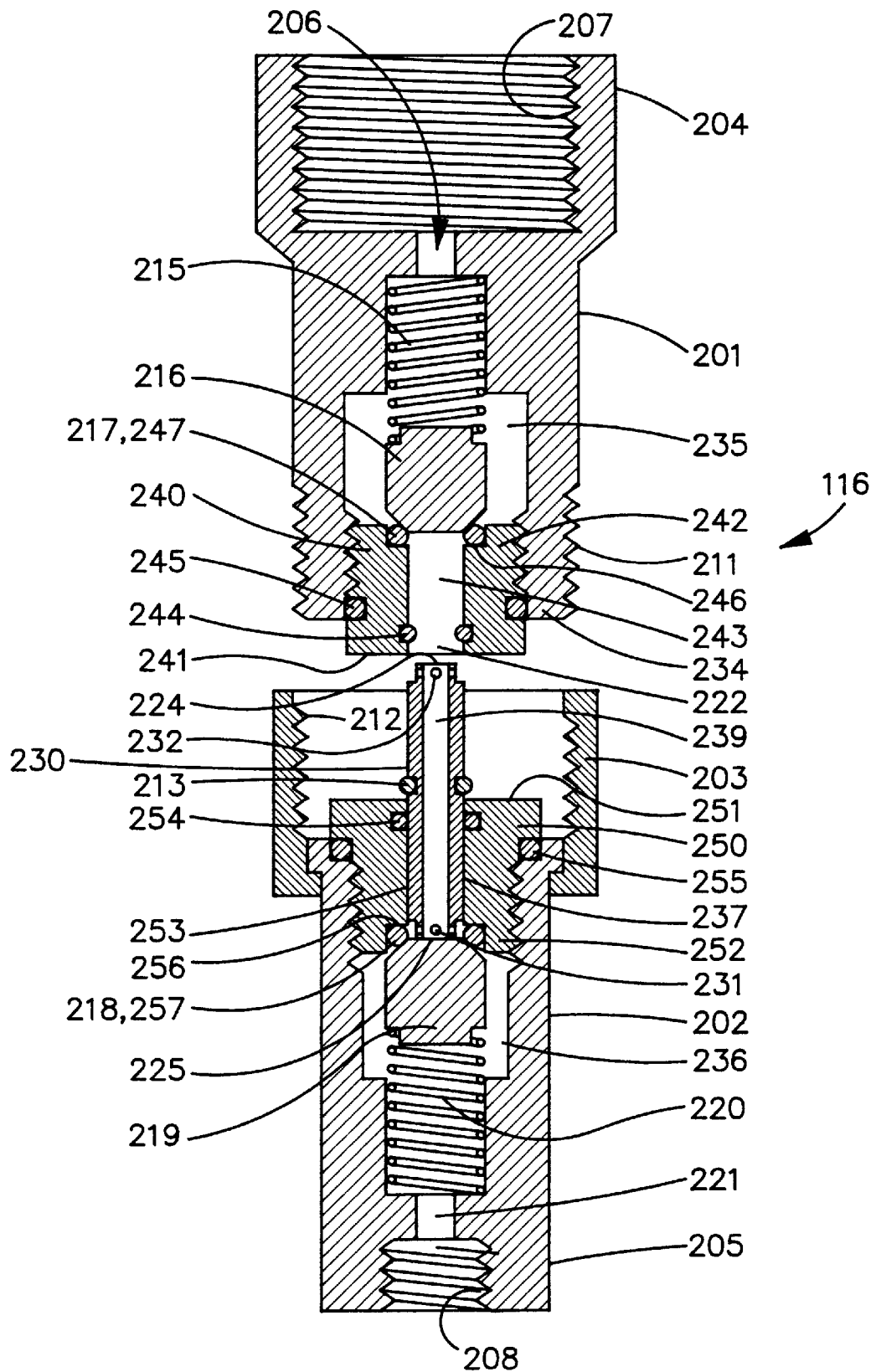
FIG. 1a illustrates a cross-sectional view of a preferred embodiment of a valve used with the invention to connect the manifold to a cylinder.
Figures 1B, 1C:
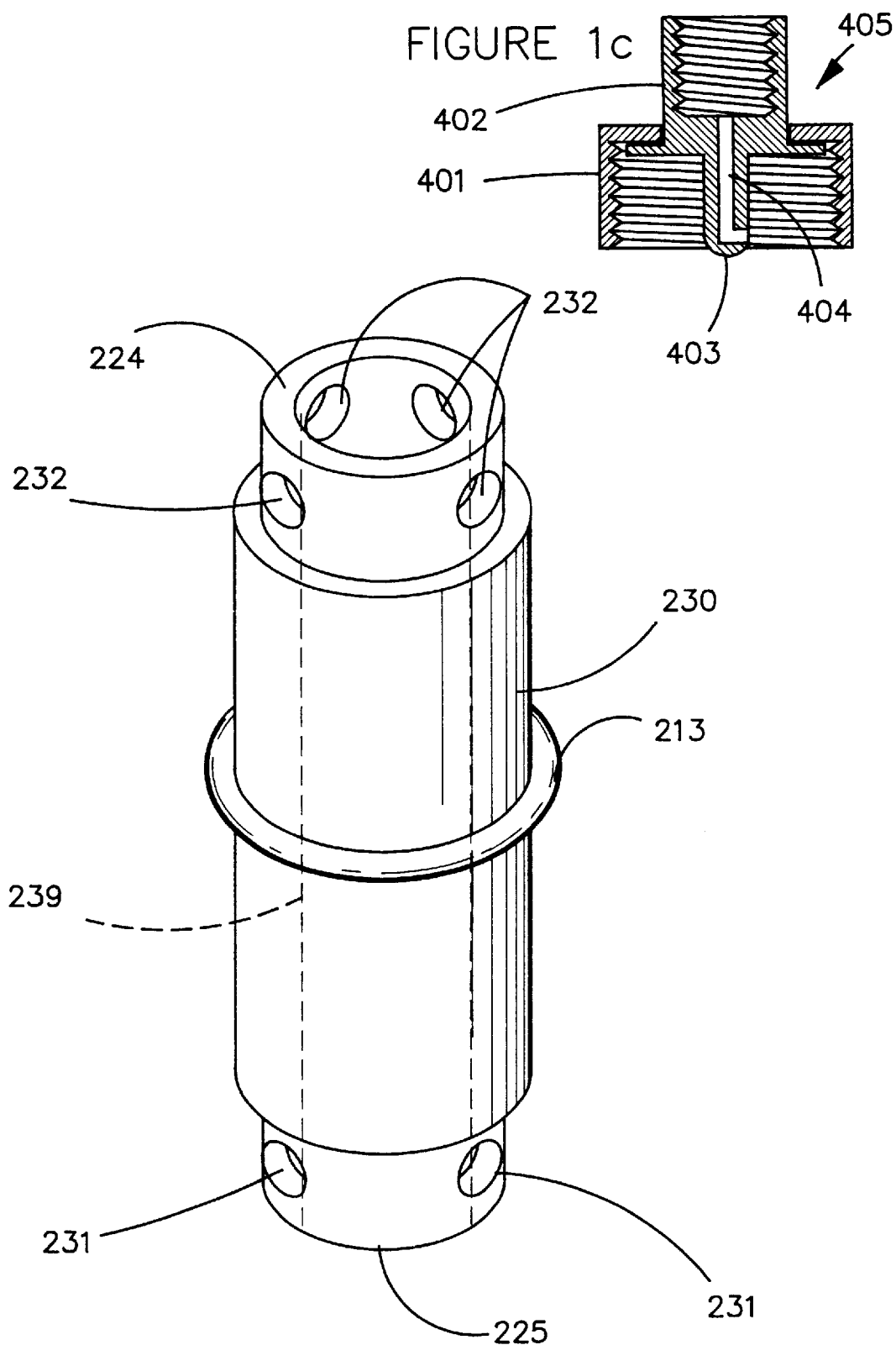
FIG. 1b illustrates the transfer tube used to transport process material between the valve bodies of the valve assembly that operatively connects the manifold to the cylinders.
FIG. 1c illustrates a fitting used to transfer process material from a cylinder having an inlet valve attached thereto.

As shown in FIG. 1a, valve assembly 116 comprises an inlet valve 201 connectable to an outlet valve 202. Valves 201, 202 may be connected directly to each other using threaded or other connections, such as a coupler 203. Coupler 203 is rotatably mounted to outlet valve 202 using a shoulder and snap ring assembly, or any other suitable assembly for connecting coupler 203 to outlet valve 202. Each valve 201, 202 is constructed similar to a spring-loaded ball or plug check valve having a plug or ball positioned within the bores 235, 236 of respective valves 201, 202.

Inlet valve 201 is configured with inlet port 206 and an outlet port 222 with bore 235 extending therebetween. First end 204 of inlet valve 201 is configured with threads 207 that mate with opposing threads on cylinder 117 or other receptacle for holding a process material. Positioned on the outer surface of inlet valve 201 at second end 234 are threads 211 that mate with corresponding threads 212 on coupler 203 or other connection member on outlet valve 202. Positioned within bore 235 is first spring 215 operatively positioned or mounted therein so that first plug 216 seals against seat 217 when at rest, thereby sealing inlet port 206 from outlet port 222. Seats 217 may be constructed from suitable o-rings.

Outlet valve 202 is configured with an outlet port 237 and inlet port 221 with bore 236 extending therebetween. First end 205 may be configured with threads 208 which mate with opposing threads on a source material manifold or with opposing threads on other process material containers. Positioned within bore 236 is second spring 220 operatively positioned or mounted therein so that second plug 219 rests against seat 218 when in a closed position, thereby sealing inlet port 221 from outlet port 237.

Transfer tube 230 is a cylindrical member having ends that are configured to slidingly insert into the bores 235, 236 of valves 201, 202 through ports 222, 237 (or bores 243, 253 of inserts 240, 250). Transfer tube 230 is configured with a bore 239 therein extending axially through transfer tube 230 between ends 224, 225. Transfer tube 230 is configured with one or more ports 231, 232 that allow fluid to flow around the respective plugs 216, 219 when ends 224, 225 engage plugs 216, 219. Ports 231, 232 may be configured to be apertures, such as circular holes. An o-ring seal 213 may be positioned around the outer walls of transfer tube 230 so that when tube 230 engages bore 235 (or bore 243), seal 213 seals bore 235 (or bore 243).

Although not required, as shown in FIG. 2a, valve assembly 116 may further comprise first and second inserts 240, 250, positioned within bores 235, 236 so that transfer tube 230 may slidingly engage first and second inserts 240, 250. Each insert 240, 250 has a face end 241, 251 and a seat end 242, 252 with a bore 243, 253 extending therebetween. An o-ring seal 244, 254 may be positioned along the walls of bores 243, 253 to provide additional seal protection when in operation. Additional o-ring seals 245, 255 may be positioned between the respective inserts 240, 250 and valve 201, 202 for additional seal protection. Inserts 240, 250 have shoulders 246, 256 along seat end 242, 252 that allow o-rings 247,257 to form seats 217,218 upon which plugs 216,219 rest in a closed position. In embodiments with inserts 240, 250, outlet ports 222, 237 are defined by the inner walls of inserts 240, 250.

If no inserts 240, 250 are used, the body of valves 201, 202 fills the area otherwise occupied by inserts 240, 250. Seals 244, 254 are then positioned in the same approximate area along bores 235, 236 that seals 244, 254 are positioned within bores 243, 253 so that transfer tube 230 sealingly and slidably engages the walls of bores 235, 236.

Inlet and outlet valves 201, 202 are preferably constructed from brass or other suitable material that is corrosion resistant to the process material flowing through the valve. The seals used in valve assembly 116 are preferably o-rings constructed from VITON, a synthetic rubber material available from E. I. DuPont De Nemours & Co., Inc. of Wilmington, Del. Inserts 240, 250 are preferably constructed from KYNAR, available from Pennwalt Corp. of Philadelphia, Pa. Springs 215, 220 are constructed from a corrosion resistant material, preferably HASTELLOY.

During the cylinder filling process, valve assembly 116 operates as follows. Inlet valve 201 is securely connected to a cylinder to be filled. Next, outlet valve 202 is securely connected to a connection line or port attached to the source container containing the material to be transported. Next, outlet valve 202 is positioned over inlet valve second end 234 so that coupler threads 212 engage corresponding threads 211 on inlet valve 201. Coupler 203 is rotated so that inlet and outlet valves 201, 202 are forced toward each other. As this occurs, transfer tube 230 inserts into inlet port 206, passing seals 244 and forming a sealed connection between the outer walls of transfer tube 230 and either the walls of bore 235 or the walls of insert 240. As coupler 203 is further rotated, transfer tube end 224 engages and abuts first plug 216, and o-ring 213 abuts face 241, preventing transfer tube 230 from moving any further into inlet valve 201 and forcing end 225 to abut and exert pressure on plug 219. As coupler 203 continues to rotate, transfer tube ends 224, 225 exert additional pressure against plugs 216, 219 until plugs 216, 219 disengage seats 217, 218.

First spring 215 has a spring constant less than the spring constant for second spring 220. Thus, first plug 216 disengages seat 217 before the additional force required to displace second plug 219 from seat 218 is exerted. When enough force has been applied to springs 215, 220 to displace both plugs 216, 219, chlorine flows from connection line 115, through port 221 into bore 236 (or into bore 254 and then into bore 236) through transfer tube bore 239, into bore 235 (or into bore 244 and then into bore 235) through port 222 and into the cylinder to be filled.

When the cylinder is filled, coupler 203 is rotated in an opposite direction until coupler 203 disengages inlet valve 201. As this occurs, the action of transfer tube 230 is reversed: second plug 219 seals against seat 218, sealing the connection lines or port from the environment, and first plug 216 seals against seat 217, sealing the filled cylinder from the environment. As second plug 219 seals against seat 218, the vapor pressure within transfer tube bore 239 equalizes to the vapor pressure within the cylinder causing any liquid within bore 239 to flash before plug 216 seats against seat 217. The phase change decreases the amount of process material within bore 239 because gasses occupy a greater volume due to a decreased density. Thus, less process material is present within bore 239. Process material (chlorine) loss is limited to the amount of material contained within transfer tube bore 239. In a preferred embodiment, transfer tube 230 is about $7/8$ inches long and bore 239 has an inside diameter of about $3/16$ inches—about 0.024 in.$^3$ Thus, each time a cylinder is filled, minimal losses of chlorine occur.

Inlet valve 201 may be connected to the standard intake valves 170 on cylinders 117 each time the cylinders are filled, but preferably cylinders 117 are retrofitted so that inlet valve 201 is attached to intake valve 170. Where the cylinder 117 has an inlet valve 201 connected to intake valve 170 or retrofitted as a part thereof, a fitting 400 may be attached thereto to allow transport from the cylinder 117 as shown in FIG. 2c. Fitting 400 is similar to outlet valve 202, but comprises a coupler 401 engageable with opposing threads 211 on inlet valve 201 and having an insert 402 positioned therein with a wand 403 that unseats plug 215 allowing flow through a bore 404 in insert 402 and into the device, apparatus, or process to which fitting 400 is attached. By controlling the number of turns coupler 401 makes when engaging inlet valve 201, a user can control the amount of process material flowing through fitting 400. More turns of coupler 401 will open plug 216 further, increasing flow through valve 201 and fitting 400, and vice versa.

While this invention has been described in terms of a preferred embodiment for use with chlorine, other liquids or gases may be processed in accordance with the apparatus and method described herein, and this invention is not limited to chlorine processing. Additionally, although threaded connections have been described herein for the cylinder valve components, other types of connections well-known in the art could also be used. Furthermore, the scope of this invention is intended to include its adaptation for use in a variety of ways where process material is transported from one container to another.

Although the preferred embodiment has been described, it will be appreciated by those skilled in the art to which the present invention pertains that modifications, changes, and improvements may be made without departing from the spirit of the invention defined by the claims.

What is claimed is:

1. A valve assembly comprising:

(a) an inlet valve connectable to an outlet valve comprising:
 (i) a first end adapted to engage a receptacle for holding process material, said first end configured to have an inlet port;
 (ii) a second end adapted to engage a second end of an outlet valve, said second end configured to have an outlet port;
 (iii) a bore extending between said inlet port and said outlet port;
 (iv) a first plug movably positioned in said bore, said first plug having an open and a closed position, said first plug sealing said inlet port from said outlet port when in a closed position;
 (v) a first spring positioned within said bore of said inlet valve so that said first spring biases said first plug in a closed position;
 (vi) a first insert positionable within said bore of said inlet valve, said first insert having a seat end and a face end, said seat end engaging said inlet plug when said inlet plug is in a closed position, said first insert having a bore extending therethrough to allow fluid communication between said inlet port and said outlet port of said inlet valve; and,
 (vii) at least one seal adapted to form a seal between a transfer tube and said bore of said first insert when a transfer tube engages said bore of said first insert (b) an outlet valve comprising:
 (i) a first end adapted to engage a source of process material, said first end configured to have an inlet port;
 (ii) a second end adapted to engage said inlet valve, said second end configured to have an outlet port;
 (iii) a bore extending between said inlet port and said outlet port; and,
 (iv) a second plug movably positioned in said bore, said second plug having an open and a closed position, said second plug sealing said inlet port from said outlet port when in a closed position;
 (v) a second spring positioned within said bore of said outlet valve so that said spring biases said second plug in a closed position, wherein a spring constant of said second spring is greater than a spring constant of said first spring;
 (vi) a second insert positionable within said bore of said outlet valve, said second insert having a seat end and a face end, said seat end engaging said outlet plug when said outlet plug is in a closed position, said second insert having a bore extending therethrough to allow fluid communication between said inlet port and said outlet port of said outlet valve; and,
 (vii) at least one seal adapted to form a seal between said transfer tube and said bore of said second insert;

(c) a transfer tube comprising:
 (i) a first end configured to be insertable at least partially within said bore of said first insert, said first end configured to have at least one port;
 (ii) a second end slidably positioned at least partially in said bore of said second insert, said second end configured to have at least one port and,
 (iii) a bore extending through said transfer tube, said bore allowing fluid communication between said at least one port in said first end and at least one port in said second end; and (d) a coupler adapted to join said inlet valve and said outlet valve.

2. The valve assembly according to claim 1 wherein said coupler is rotatable mounted on said outlet valve.

3. The valve assembly according to claim 1 wherein said transfer tube further comprises at least one sealing member positioned thereon, said sealing member forming a seal between said transfer tube and said first insert when said transfer tube engages said bore of said first insert.

* * * * *